March 29, 1966 A. C. BOGGS Re. 25,994

HERMETICALLY SEALED, SHEATHED ELECTRIC HEATING ELEMENTS

Original Filed Aug. 16, 1961

Prior Art

INVENTOR.
Alben C. Boggs
BY
Michael Williams
ATTORNEY

United States Patent Office

Re. 25,994
Reissued Mar. 29, 1966

25,994

HERMETICALLY SEALED, SHEATHED ELECTRIC HEATING ELEMENTS

Alben C. Boggs, Pittsburgh, Pa., assignor to Edwin L. Wiegand Company, Pittsburgh, Pa.

Original No. 3,122,718, dated Feb. 25, 1964, Ser. No. 131,851, Aug. 16, 1961. Application for reissue Dec. 23, 1964, Ser. No. 441,941
5 Claims. (Cl. 338—274)

Figure 1:
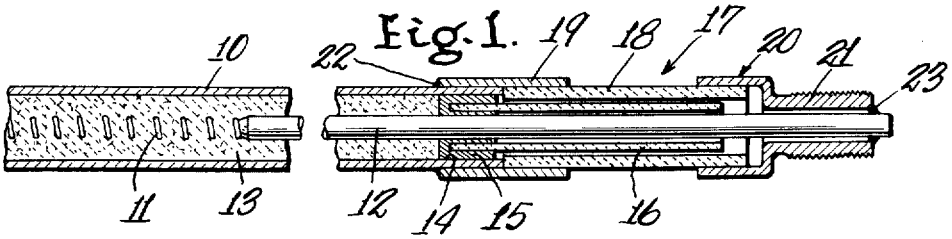

Matter enclosed in heavy brackets [ ] appears in the original patent but forms no part of this reissue specification; matter printed in italics indicates the additions made by reissue.

The present invention relates to electric heating, more particularly to hermetically sealed, sheathed electric resistance heating elements and methods of making the same, and the principal object of the invention is to provide new and improved methods and articles of the character described.

When a metallic, tubular sheathed electric resistance heating element is hermetically sealed and then operated at elevated temperatures, a perplexing phenomenon has been observed. Initially, breakdown voltage, i.e., that voltage which will jump from the normal current carrying internal parts of the element to the external sheath, will be satisfactorily high indicating that internal dielectric clearances are adequate; however, after the unit has been operated for some time at elevated temperatures, its breakdown voltage drops to such a low level that the element will short out and thus fail at normal operating voltages. Study of elements which have failed as above described indicates that the air gap at the terminal end of the element for some reason becomes inadequate after a short period of operation although it is quite adequate initially and quite adequate for elements which are not hermetically sealed.

The present invention, by means of a novel structure and a novel method, provides a hermetically sealed, tubular sheathed electric resistance heating element whose breakdown voltage remains sufficiently high to insure against premature element failure. This is accomplished in a relatively simple manner and at little increase in manufacturing cost. These and other advantages will readily become apparent from a study of the following description and from the appended drawing.

Figure 2:
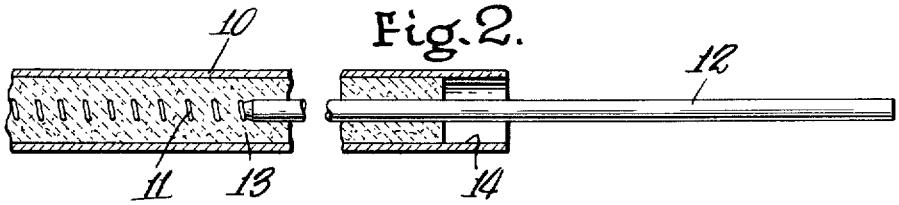
Figure 3:
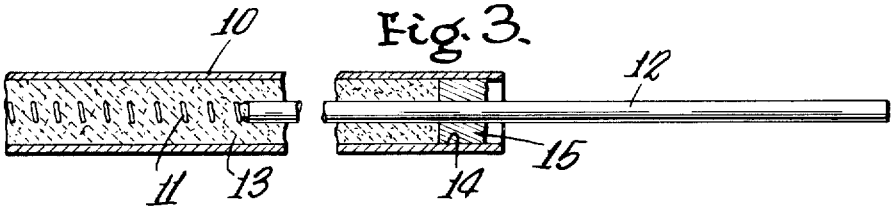
Figure 4:
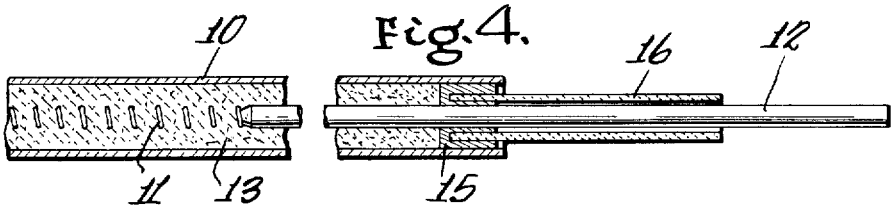
Figure 4:
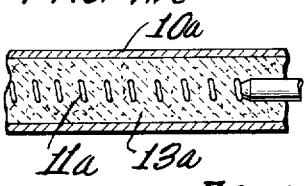
Figure 6:
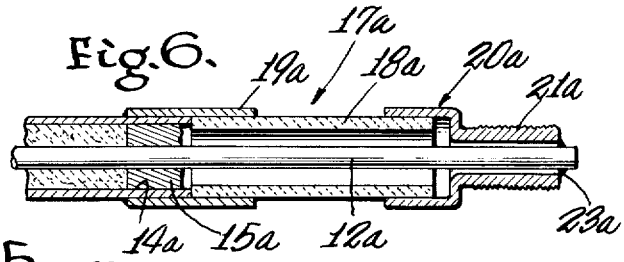
Figure 5:
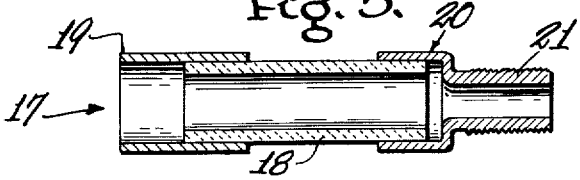

In the drawing accompanying this specification and forming a part of this application there is shown, for purpose of illustration, an embodiment which the invention may assume, and in this drawing:

FIGURE 1 is a fragmentary, broken view in longitudinal section of a heating element embodying the present invention, FIGURES 2, 3 and 4 illustrate successive stages in the manufacture of the element seen in FIGURE 1, FIGURE 5 is a sectional view of certain structure seen in FIGURE 1, and FIGURE 6 is a view similar to FIGURE 1 but of prior art construction.

With reference to FIGURES 1 and 2, there is fragmentarily illustrated one end of an electric resistance heating element of the well-known type having a tubular metallic sheath 10 enclosing a coiled resistor conductor 11 which terminates short of the sheath end. A terminal conductor pin 12 is connected to the end of the resistor conductor 11 and projects axially outwardly beyond the end of the sheath 10 for connection to a source of electrical energy. Sheath 10 is filled with highly compacted, electric-insulating, heat-conductive material 13 which maintains the resistor conductor and the terminal pin centered within the sheath. For a purpose to appear, material 13 preferably terminates short of the end of the sheath to form a recess 14 thereat.

Substantially filling the sheath recess 14 is a body of cement-like, dielectric material 15 in which is embedded one end of a dense, dielectric ceramic sleeve 16 through which passes the terminal pin 12. Sleeve 16 terminates short of the free end of the terminal pin for a reason later to appear.

The means for hermetically sealing the heating element thus far described comprises an assembly 17 best seen in FIGURE 5. Such assembly includes an enlarged, dielectric ceramic sleeve 18 having at one end a metal collar 19 and at the other end a metal ferrule 20. Collar 19 and ferrule 20 are hermetically sealed to the exterior of sleeve 18 in axially spaced relation and each projects beyond adjoining sleeve ends. The projecting portion of collar 19 is of a size to closely fit over the exterior of the sheath 10 while the projecting portion of ferrule 20 is necked down at 21 to pass the terminal pin 12. Ferrule portion 21 may be externally threaded, as shown, to facilitate its connection to a source of electrical energy.

Assembly 17 is secured to the sheath 10 of the heating element by sliding it over the terminal pin 12 until the end of the sheath enters the collar 19 and abuts the sleeve 18. Collar 19 may then be hermetically sealed to the sheath by means of a silver soldered joint 22 or the like. Completing the assembly, a silver soldered joint 23 secures the ferrule 20 to the terminal pin 12.

In assembling the heating element illustrated in FIGURE 1, the recess 14 of the unsealed element as seen in FIGURE 2 is first substantially filled with the material 15 in a plastic state as shown in FIGURE 3. The sleeve 16 is then slid over the terminal pin 12 and forced into the still plastic material 15 in the sheath recess 14. The sleeve end will be deeply embedded in material 15, the latter being compressed and extruded about the exterior of the sleeve and into its interior substantially as shown to preclude the presence of any air gaps across which electrical current might jump. Thereafter, and preferably following hardening of the material 15 to a rock-like mass, the assembly 17 will be slid over the terminal pin and silver soldered or the like to the element sheath 10 and to the terminal pin 12 as previously described.

While but one terminal end of the heating element has been shown and described, it will be understood that its other terminal end will be similarly constructed. Moreover, it is also to be understood that the invention is not limited to elements having terminals at opposite ends thereof but may also be employed with elements having their terminals in adjoining relation.

The advantage of the present invention will become apparent from a study of the prior art construction seen in FIGURE 6 wherein similar parts are identified with the same reference characters as before but with the suffix "a" added. In this prior art construction, current will jump the relatively small air gap between the terminal pin 12a and the extreme terminal end of the sheath 10a under the conditions previously outlined. However, with the construction shown in FIGURE 1, the addition of the sleeve 16 will force the current to travel practically the entire length of such sleeve in order to bridge the gap between the terminal pin and the extreme end of the sheath. In practice, the normal voltages impressed across the heater terminals will be unable to jump such a tremendously increased air gap and thus electrical breakdowns which previously plagued sealed heating elements is effectively prevented.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An electric resistance heating element comprising a tubular metallic sheath and a resistor conductor in radially spaced relation with said conductor disposed within said sheath in axially spaced relation from one end thereof, a terminal conductor pin secured to said resistor conductor within said sheath and projecting outwardly of said one sheath end, compacted, electric-insulating, heat conductive material within said sheath embedding said resistor *conductor* and terminal [conductors] *conductor pin* and such material terminating short of said one sheath end to form a recess thereat, a metallic sleeve having a fluid-tight fused connection with said one sheath end and projecting axially therebeyond, a metallic cap having a fluid-tight fused connection with the outwardly projecting portion of said terminal pin and disposed in axially spaced relation with the metallic sleeve aforesaid, [and ceramic sleeve means through which said terminal pin extends and having a first portion extending between and hermetically sealed to said metallic sleeve and said metallic cap and a second portion extending into said sheath end recess, said ceramic sleeve means comprising] a first ceramic sleeve extending over said terminal pin between *and hermetically sealed to* said metallic sleeve and said metallic cap, and a second ceramic sleeve extending over said terminal pin and projecting from the recess at said one sheath end axially beyond the latter.

2. The construction of claim 1 wherein said first and second ceramic sleeves are in concentric[, superimposed] relation *with the first about the second.*

3. The construction of claim 2 wherein cement-like dielectric material is hardened in situ in said sheath end recess and embeds the adjoining portion of said second ceramic sleeve.

4. The method of forming a hermetically sealed closure at the terminal end of a tubular, metallic sheathed, embedded electric resistance heating element having at such end an axially facing recess through which a terminal conductor pin protrudes beyond the sheath end, which method comprises disposing a plastic, cement-like dielectric material in said recess which subsequently hardens in situ, sliding over said terminal conductor pin and into said recess a first ceramic sleeve having a length less than that of the protruding portion of said pin and greater than that of said recess to embed such sleeve in said plastic material, sliding over said terminal conductor pin and said first ceramic sleeve a second ceramic sleeve having a metal collar and a metal ferrule hermetically sealed to respective sleeve ends in axially spaced relation with each other so that the element sheath fits within said collar and said terminal pin fits within said ferrule, and forming a fluid-tight juncture between the element sheath and said collar and between said terminal conductor pin and said ferrule.

*5. The method of forming a hermetically sealed closure at the terminal end of a tubular, metallic sheathed, embedded resistance heating element having at such end an axially facing recess through which a terminal conductor pin protrudes beyond the sheath end, which method comprises disposing a plastic, cement-like dielectric material in said recess which subsequently hardens in situ, sliding over said terminal conductor pin ceramic sleeve means having a reduced end fitting within said sheath recess and extruding said plastic cement-like material about its peripheral end surfaces and into bonding relation therewith and with the adjacent inner surface of said sheath, said sleeve means having a metal collar at one end and a metal ferrule at its other end, both collar and ferrule being hermetically sealed to said sleeve means, said collar slidably fitting over said sheath end and said ferrule slidably fitting over said terminal conductor pin, and forming a fluid-tight juncture between the element sheath and said collar and between said terminal conductor pin and said ferrule.*

References Cited by the Examiner

The following references, cited by the Examiners, are of record in the patented file of this patent or the original patent.

UNITED STATES PATENTS

| | | | |
|---|---|---|---|
| 2,272,282 | 2/1942 | Wiegand | 338—238 |
| 2,455,102 | 11/1948 | Temple | 338—242 |
| 2,480,903 | 9/1949 | Charbonneau | 338—274 X |
| 2,740,874 | 4/1956 | Kelly et al. | 338—274 X |
| 2,767,288 | 10/1956 | Lennox | 338—238 |
| 3,134,956 | 5/1964 | Boggs | 338—273 |

FOREIGN PATENTS

| | | |
|---|---|---|
| 755,741 | 9/1933 | France. |

RICHARD M. WOOD, *Primary Examiner.*

V. Y. MAYEWSKY, *Assistant Examiner.*